Jan. 1, 1929. 1,697,064
F. G. HUGHES
ANTIFRICTION BEARING AND SEPARATOR THEREFOR
Filed June 30, 1922
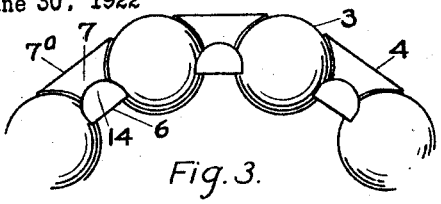
Fig. 3.
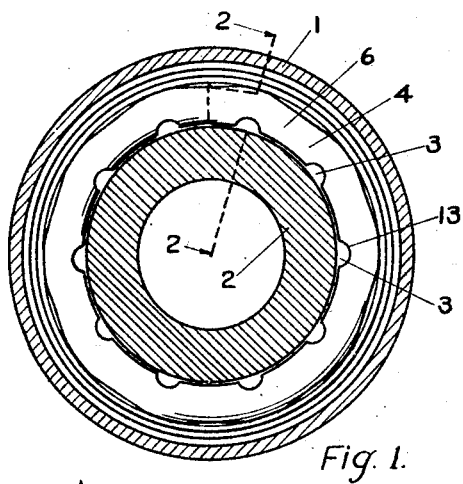
Fig. 1.
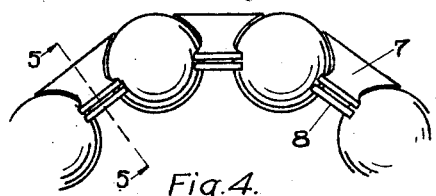
Fig. 4.
Fig. 5.
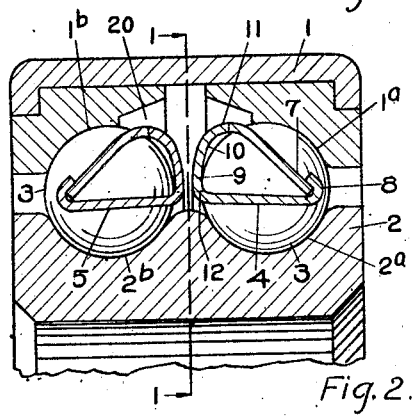
Fig. 2.
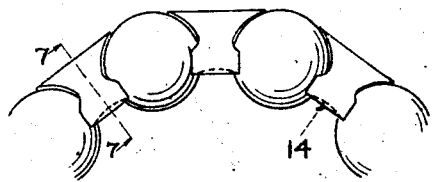
Fig. 6
Fig. 7.
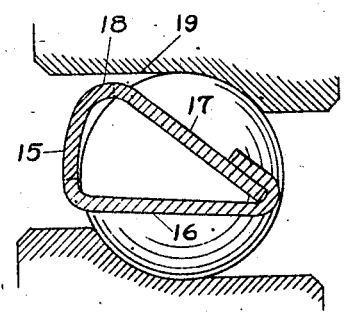
Fig. 8.
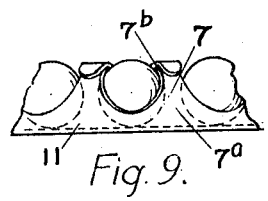
Fig. 9.
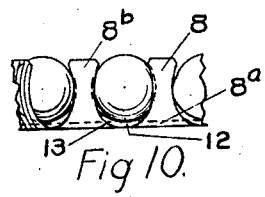
Fig. 10.
INVENTOR:
Frederick G. Hughes,
BY
ATTORNEY.

Patented Jan. 1, 1929.

1,697,064

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION BEARING AND SEPARATOR THEREFOR.

Application filed June 30, 1922. Serial No. 572,018.

This invention is in the art of antifriction bearings, more especially of the ball type, and relates particularly to a separator for the antifriction members or balls of such a bearing, such separator being of the retaining type. In manufacturing antifriction bearings, it is the desire, and indeed a practical necessity, to provide a separator which while strong and efficient shall be of simple form and therefore of low cost. The present separator is of a design and character giving it a simple, efficient, strong form and low production cost.

One object of the invention is to provide an antifriction bearing having a separator with the desirable characteristics above indicated.

Another object is to provide a separator strong and efficient in character while of simple form and low cost.

Another object is to provide a single piece retaining separator, more particularly for angular-contact bearings, such separator comprising a body or base portion provided with opposed and mating connected wings formed and positioned to present, together with the body, antifriction member pockets into which the antifriction members can be snapped.

To these ends, and also to improve generally upon devices of the character indicated, my invention consists in the various matters hereinafter described and claimed.

Without restricting the invention thereto I describe the same with more particular reference to the embodiments thereof illustrated in the accompanying drawings.

In these drawings:—

Figure 1 is a cross-sectional view of an annular angular-contact double-row ball bearing having separators of the present invention, the section being taken substantially on the line 1—1 (and its continuation) of Figure 2, and the view showing one of the separators in elevation;

Figure 2 is a fragmental enlarged sectional view of the bearing illustrated in Figure 1, the section being taken through the bearing about on the plane indicated by the line 2—2 of Figure 1;

Figure 3 is a fragmental view of the separator illustrated in Figures 1 and 2 and showing the side thereof which is unexposed in Figure 1;

Figure 4 is a view similar to Figure 3, of a somewhat modified separator;

Figure 5 is a cross-sectional view of the separator illustrated in Figure 4, taken substantially on the line 5—5 of Figure 4;

Figure 6 is a view similar to Figure 3, of a further modification;

Figure 7 is a sectional view taken substantially on the line 7—7 of Figure 6;

Figure 8 is a cross-sectional view, similar to Figure 2, of a separator similar to that shown in Figures 1, 2 and 3, showing the same adapted to and installed in a single-row angular-contact bearing;

Figure 9 is a fragmental elevational view of the outer periphery of the separator illustrated in Figures 1, 2, and 3; and Figure 10 is a view similar to Figure 9, but of the inner periphery of the separator.

Referring now to the drawings, and for the present to Figures 1, 2 and 3, 9 and 10, the illustrated bearing comprises the inner and outer opposed annular race members 1 and 2, with the mating raceways $1^a$, $2^a$ and $1^b$, $2^b$ relatively located to give angular contact to the two annular series of balls 3, 3 carried upon and between the raceways. A separator 4 or 5 of the present invention is provided for each of the series of balls; since the two illustrated separators (Figure 2) are alike a description of one will suffice for both.

In accordance with the invention the separator 4 is formed from a single piece of material, as steel, and comprises the body proper or annulus 6 with two series of mating and cooperating wings, as 7 and 8, projecting from the peripheries of the annulus. These wings are spaced circumferentially of the annulus 6 to receive a ball 3 between each wing and the immediately adjacent wing, as shown in Figures 1 and 3. The wings have relatively broad bases as indicated at $7^a$ and $8^a$, and are flared adjacent their ends as indicated at $7^b$ and $8^b$, the sides of the wings having substantially arc-shaped contours. Also, mating wings are positioned with respect to each other so as to bring their ends $7^b$ and $8^b$ closely adjacent at a point well beyond the center of the ball and, indeed, substantially at the plane of the ends of the rotation diameters, and the outer wing lies above the center of the ball, and the inner wing below it, with the mating wings extending on opposite sides of the ball centers and having their edges curving about the ball to confine it. In other words, the inner wings pass inside the circle through the centers of the balls and extend axially beyond said circle; the outer wings pass outside the circle through the centers of the balls and are also extended axially beyond said circle. The outer wings are bent inwardly at an inclination to meet the inner wings at a bracing angle; the two series of wings enclose the circle through the ball centers and the edges of the wings conform to the balls to confine them. The wings are resilient and one series, at least, passes near enough to the circle through the centers of the balls to allow the balls to be readily snapped into the retainer after the bending of the wings into contact. The shapes and relative positions of the wings are such (as shown) that a mated pair of wings, the pair next, and the intermediate portion of the body 6, present a ball retaining pocket. Into these pockets the balls, due to the resilient character of the material of the separator, can be "snapped", the dimensions of the pockets being such that the pockets properly retain the balls while in use and yet permit snapping in of the balls. Furthermore, the character and form of the pockets are such that the separator is held against material radial or lateral play thus avoiding rubbing of the separator against the race-member parts and, in a double-row bearing, rubbing of one separator against the other. As will be seen, the space between the units of a pair of wings provides a suitable lubricant-retaining receptacle.

As here illustrated, more particularly in Figures 2, 9 and 10, the body or base, starting substantially at the portion 9 near the inner periphery of the body (that is, the portion which lies the nearer the major or shaft axis of the bearing) is curved crosswise of the body as indicated at 10, and turned at substantially right angles to the portion 9, as indicated at 11. This crosswise curving gives a particularly strong body. The inner wings or fingers 8 spring from the portion 9, and indeed encroach somewhat thereon as indicated at 12 to relieve the balls at the points 13 (Figure 1); while the outer wings or fingers 7, spring from the upturned portion 11. Also as illustrated, the inner wings project or upstand substantially perpendicularly from the body 6, and the outer wings are bent toward the inner wings. With this construction, the separator is adapted for proper reception between the race members, as 1 and 2, of an angular-contact bearing; the body or base 6 lying substantially in a plane at right angles to the major axis of the bearing, the inner wings lying substantially parallel to that axis, and to the periphery of the inner race member, and the outer wings lying substantially parallel to the raceway of the outer race member. Hence, the restricted space between the races is utilized to the best advantage and the pockets can be deep at one side without interfering with the races.

As indicated in Figures 2 and 3, and 6 and 7, one of each pair of mating wings, as 7 or 8, is desirably provided with an extension, or fastener, 14 integral therewith and bent over and upon the mating wing to thereby firmly connect the ends of the wings. This holds the wings from spreading, for example, under wedging action of the balls, and gives a particularly strong separator. As indicated in Figures 2 and 3, the fastener 14 may be integral with the inner wing, or, as shown in Figures 6 and 7, may be integral with the outer wing. If desired, however, the separator may be made without a fastener, this type being shown in Figures 4 and 5. As will be understood, the separators illustrated in Figures 4 and 5, 6 and 7 are essentially like that illustrated in Figures 1, 2, 9 and 10.

As further illustrating the uses and possibilities of the present type separator, I have, in Figure 8, illustrated a single-row angular-contact bearing having such a separator. It will be noted that its body 15, inner wings 16 and outer wings 17 properly conform to the race members, wherefor the separator is readily and properly receivable in the annular space between the race members. The separator is of course essentially like the previously described forms and may be with or without the fastening means 14, and the fastening means may be provided on the inner or outer wings. Its notable difference from the separator of Figure 2 is that it, at the portion 18, lies somewhat nearer the axis of the bearing than does the corresponding portion 11 of the separator 4. This provides suitable clearing of the portion 19 of the bearing. In the particular type of bearing illustrated in Figure 2, since the outer race member 1 provides suitable clearance at the annular space 20, the separator may extend radially substantially to the outermost point of the ball, as shown. Of course, should a double-row bearing require it, or it be desirable for any reason, the separators of such bearing may be of the type illustrated in Figure 8.

Without restricting the invention thereto I may say, by way of example merely, that I have found satisfactory a double-row separator having an angle of about 42.5° between the ends of the wings and a single-row separator having a corresponding angle of about 35.5°, the inner wing in each separator inclining toward the bearing axis at about 92.5° to the body portion.

It will be seen that I have provided a separator of simple inexpensive character which, due to the curved form of its body, is very strong, which properly separates and retains the balls with a minimum of friction, presents suitable lubricant receptacles between the balls, has ball pocket formers which cannot be spread apart under wedging action of the balls, is held against material radial and lateral play thus avoiding rubbing of the separator against the race member parts and, in a double-row bearing, the rubbing of one separator against the other, and which has numerous other desirable characteristics.

I claim:

1. A retaining separator for a circular row of antifriction balls, comprising an annular sheet metal base lying at one side of the row of balls, a series of spaced wings bent laterally from each edge of the base, the wings of one series mating with those of the other series to provide a row of ball retaining pockets, the wings of one series passing inside the circle through the centers of the balls and being extended axially beyond said circle, the wings of the other series passing outside the circle through the centers of the balls and also being extended axially beyond said circle, one series of wings being inclined towards and meeting the wings of the other series at an angle whereby the mating wings mutually brace one another, the meeting points being axially beyond the circle through the centers of the balls and the edges of the wings conforming to the balls to hold the balls in their pockets and to form closed pockets between the balls, and the wings being resilient to allow snapping of the balls into the pockets after the mating wings are bent into contact; substantially as described.

2. A retaining separator for antifriction balls comprising a base having a series of spaced wings outstanding from each edge, with the units of each series mated with those of the other to provide a series of spaced ball pockets therebetween, the units of each series extending beyond the center of the ball to be received and the units of one series being bent toward the units of the other in position to substantially space the mating wings to a point beyond the center of the received ball and then bring their ends closely adjacent, the ends of the units of a mated pair of wings being secured together between the balls; substantially as described.

3. A retaining separator for antifriction balls comprising a base having a series of spaced wings outstanding from each edge, with the units of each series mated with those of the other to provide a series of spaced ball pockets therebetween, the units of each series extending beyond the center of the ball to be received and the units of one series being bent toward the units of the other in position to substantially space the mating wings to a point beyond the center of the received ball and then bring their ends closely adjacent, the end of one unit of a mated pair of wings being bent over and upon its mate to secure the same together; substantially as described.

4. An annular retaining separator for antifriction balls comprising an annular base having a series of spaced wings outstanding from each edge, with the units of each series mated with those of the other to provide a series of spaced ball pockets therebetween, the units of each series extending beyond the center of the ball to be received and the units of one series being bent toward the units of the other in position to substantially space the mating wings to a point beyond the center of the received ball and then bring their ends closely adjacent, the end of one unit of a mated pair of wings being bent over and folded upon its mate to secure the same together; substantially as described.

5. In a ball bearing comprising inner and outer race members and a row of balls between, with one of the race members having its periphery substantially parallel, longitudinally, to the rotation axis of the bearing and the other race member having an angularly disposed raceway, the combination of a retaining separator comprising an annular base having a series of spaced wings outstanding from each edge, the wings of one series being mated with those of the other series to provide a series of ball pockets, the wings of one series being bent to lie substantially parallel to the periphery of their adjacent race member and the wings of the other series being bent to lie substantially parallel to the raceway of their adjacent race member, the wings of one series having bracing contact at their ends with the wings of the other series, and said mating wings meeting at an angle and surrounding the circle through the centers of the balls to retain the balls in their pockets; substantially as described.

6. In an annular ball bearing of the angular contact type and comprising inner and outer annular race members, the inner having its periphery substantially parallel, longitudinally, to the rotation axis of the bearing and provided with a raceway, and the outer having an angularly disposed raceway, and balls between said members and upon said raceways; the combination with said members and balls of an annular retaining separator comprising an annular base curved crosswise and having a series of spaced wings outstanding from each edge, with the units of each series mated with those of the other to provide a series of spaced ball pockets therebetween, the units of each series extending beyond the center of the ball to be received, the units of the inner series outstanding at substantially right angles to the base to lie substantially parallel to the periphery of the inner race member, the units of the outer series being bent to lie substantially parallel to the outer race member and bent toward the units of the inner series in position to substantially space the mating wings to a point beyond the center of the received ball and then bring their ends closely adjacent, and the end of one unit of a mated pair of wings being bent over and upon its mate to secure the same together, substantially as described.

In testimony whereof I hereunto affix my signature.

FREDERICK G. HUGHES.